Patented May 28, 1940

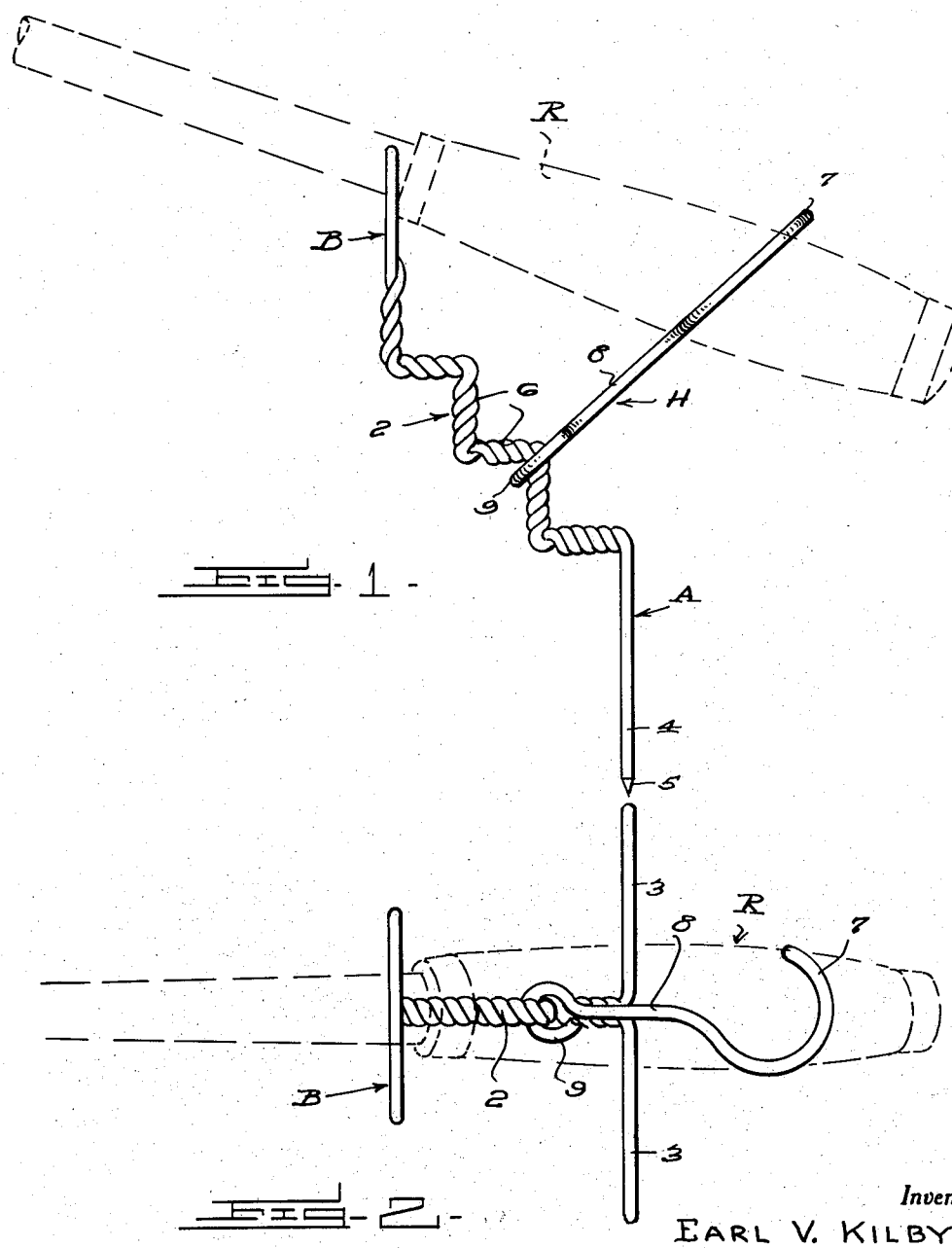

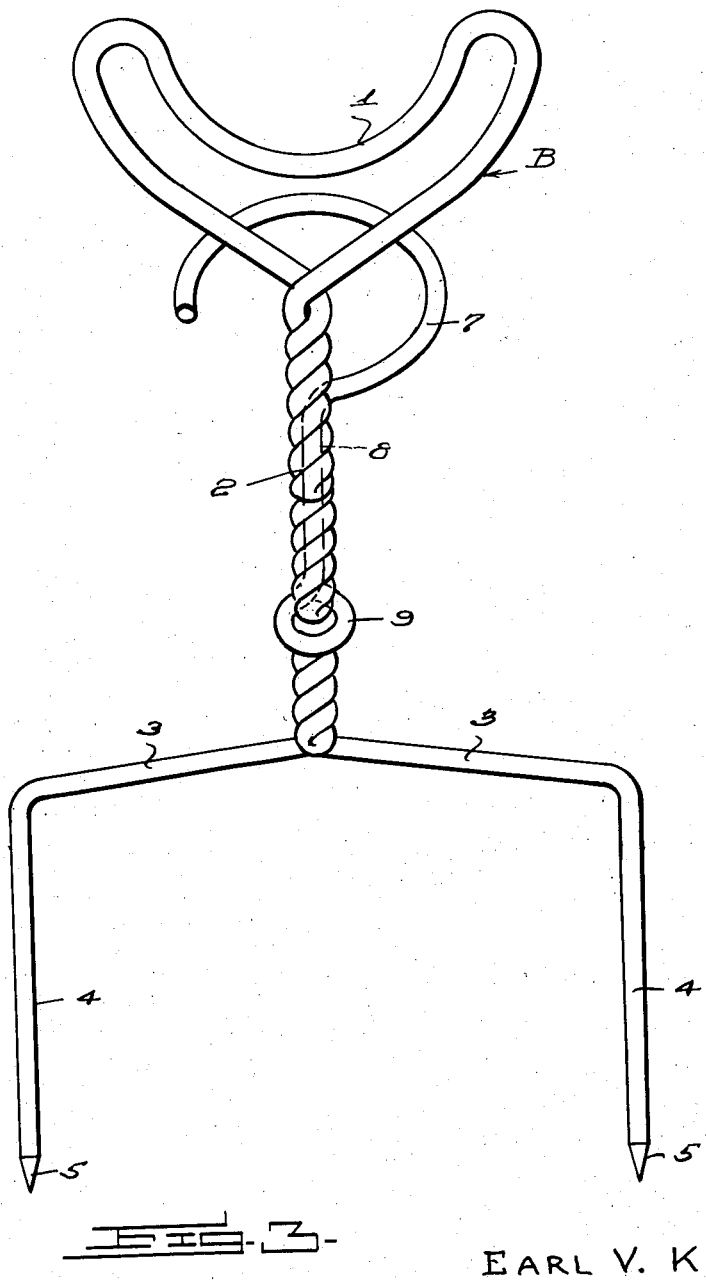

2,202,739

UNITED STATES PATENT OFFICE 2,202,739

FISHING ROD SUPPORT

Earl V. Kilby, Chagrin Falls, Ohio

Application July 5, 1939, Serial No. 282,877

2 Claims. (Cl. 248—38)

This invention relates to a support for a fishing rod or pole, the general object of the invention being to provide means for supporting the pole or rod in fishing position without the fisherman holding or touching the same.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which Figure 1 is an elevation showing how the device acts to hold a rod, the rod being shown in dotted lines.

Figure 2 is a top plan view of Figure 1.

Figure 3 is a front view of the device.

As shown in these views the body portion A of the device is formed preferably of a single piece of wire, the central portion of which is bent into loop shape as shown at B and then the loop is bent into the shape of a U so as to provide a curved seat 1 for a portion of the fishing rod R as shown in Figures 1 and 2. Then portions of the wire are twisted together for a considerable distance to provide the shank 2 and then at the end of the shank the wire portions are separated to extend downwardly and outwardly in opposite directions to provide the substantially horizontal part 3 and then the wires are bent downwardly and vertically to provide the legs 4 which are pointed at the lower end as shown at 5. The shank is bent to provide the steps 6 as shown in Figure 1. Another piece of wire is bent to form a hook H which includes the hook part 7, the shank 8 and the eye 9, the eye fitting over the stepped shank 2 as shown in Figures 1 and 2. As shown in Figures 1 and 2 the fishing rod is placed with the parts in the seat 1 and with the part 7 of the hook engaging the handle so that a portion of the rod bears against the seat 1 and is prevented from tilting by the hook bearing against the upper portion of the handle. By placing the eye 9 of the hook in different angles formed by the steps 6 the device can be adjusted to hold rods of different sizes. As will be seen the greater the pull on the tip end of the rod the more firmly the device will hold the rod.

Of course, the parts 4 are pressed into the dirt at the edge of the stream or other body of water with the pole in the position shown and having a tip end extending over the body of water or substantially so.

The device can be formed of pressed steel and by making the parts 4 very sharp the device can be used on a boat, wharf or the like by pressing these parts into the boards or into cracks or otherwise attaching the device in an upright position to a member adjacent a body of water.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A fishing rod holder comprising a base part forming supporting means, a shank rising from the base part and having a wide part at its upper end, the top of which is shaped to provide a concavity to form a seat for a part of a fishing rod, said shank being shaped to provide a plurality of angle-shaped portions and a hook having an eye at its lower end through which the shank passes and which is adapted to engage any one of the angle-shaped parts, the hook part being adapted to engage the handle of the fishing rod to releasably hold the rod with a part resting on the seat forming portion.

2. A fishing rod holder comprising a member formed of wire having intermediate portions twisted together to form a shank, the ends of the wire at the bottom of the shank being bent to form a yoke-shaped part, the extremities of which are pointed, other portions of the wire at the top of the shank being bent to form a loop, the top of which is curved downwardly to provide a seat for receiving portion of a rod, the shank being bent to provide a plurality of angle-shaped parts, a hook member having a shank provided with an eye at its lower end and a hook at its upper end, the hook engaging over the handle of a rod and the eye engaging any one of the angle-shaped parts of the shank of the device.

EARL V. KILBY.